United States Patent [19]

Rekant

[11] 4,295,331

[45] Oct. 20, 1981

[54] PROCESS FOR THE PRODUCTION OF ENERGY FROM SOLID HYDROCARBON FUELS

[76] Inventor: Uriel Rekant, Kovlosky St. 22/5, Kiryat Herzog, Bnei Brak, Israel

[21] Appl. No.: 8,199

[22] Filed: Jan. 31, 1979

[30] Foreign Application Priority Data

Mar. 7, 1978 [IL] Israel .................................... 54214

[51] Int. Cl.$^3$ .......................................... F02B 43/08
[52] U.S. Cl. ................... 60/39.02; 60/39.12; 423/415 A
[58] Field of Search ............ 60/39.02, 39.12, 39.46 G; 110/269; 423/415 A

[56] References Cited

U.S. PATENT DOCUMENTS

| | | | |
|---|---|---|---|
| 2,386,336 | 10/1945 | Mosshart | 110/269 |
| 3,916,617 | 11/1975 | McKenzie et al. | 60/39.02 |

FOREIGN PATENT DOCUMENTS

| | | | |
|---|---|---|---|
| 1950517 | 4/1971 | Fed. Rep. of Germany | 423/415 A |
| 2001844 | 7/1971 | Fed. Rep. of Germany | 423/415 A |
| 2711991 | 9/1978 | Fed. Rep. of Germany | 423/415 A |

*Primary Examiner*—Louis J. Casaregola
*Attorney, Agent, or Firm*—Lawrence Rosen

[57] ABSTRACT

The invention provides an economical continuous process for the production of energy from solid hydrocarbon fuels comprising conveying a solid hydrocarbon fuel through a reactor substantially filled with $CO_2$ and raising the temperature within the reactor to at least about 400° C. whereby in the substantial absence of air the solid hydrocarbon fuel reacts endothermically with $CO_2$ to form CO, conveying the relatively light CO and other accompanying and formed gases from the top of said reactor to a combustion chamber for exothermic reaction of the CO gas with $O_2$ to form $CO_2$ and to generate both heat and gas pressure energy and recycling at least a portion of the gases exiting from said combustion chamber to a reactor for further reaction with solid hydrocarbon fuel. The invention thus provides an economical process for conversion of steam driven electric generating stations as well as other gas turbine and/or gas or liquid fuel powered engines to the use of solid hydrocarbon fuels, such as, coal, shale or peat.

6 Claims, 3 Drawing Figures

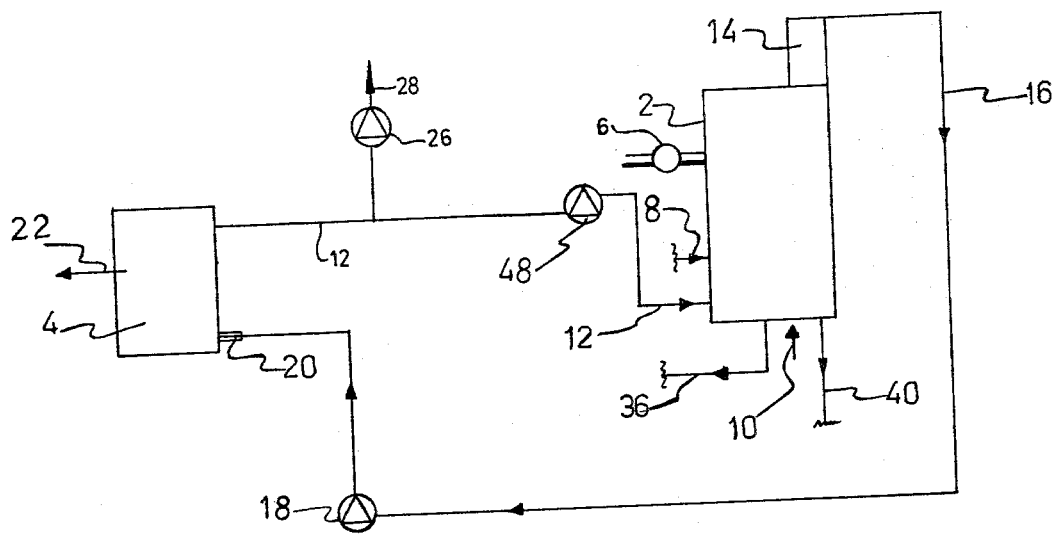
FIG. 1
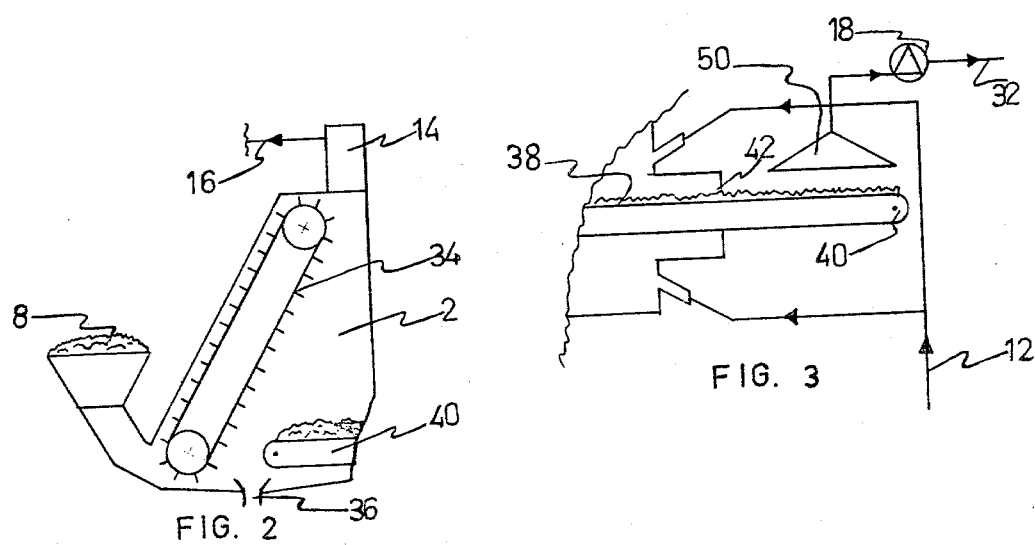
FIG. 2
FIG. 3

PROCESS FOR THE PRODUCTION OF ENERGY FROM SOLID HYDROCARBON FUELS

The present invention relates to a process for the production of energy from solid hydrocarbon fuels.

More particularly the present invention is directed to an economical process for conversion and/or operation of steam electric generating stations as well as other gas turbine and/or gas or liquid fuel powered engines using solid hydrocarbon fuels such as coal, shale or peat.

As is known, the existing liquid-fuel-heated, steam-operated, electric-generating stations in use today as well as gas turbine installations using gas or petroleum products as fuel have heretofor not been adaptable to alternatively use coal, shales or peat as a fuel in case of a liquid fuel shortage and for this reason the news has been replete with suggestions for building atomic powered generators and/or special installations capable of operating also on solid hydrocarbon fuels in case of a further oil boycott.

It is to be noted, however, that continuous systems using coal or other solid hydrocarbon fuels to date usually involve the direct combustion of coal at high temperatures to heat water to steam which steam is then directed to a steam turbine to generate electricity which as will be explained hereinafter is not the most efficient way of generating maximum energy from coal. Furthermore, as will be realized, a standard boiler or combustion chamber adapted to burn liquid or gas fuels cannot be readily adapted to process and burn massive amounts of solid fuels such as coal and this inadaptability has heretofor been the major stumbling block preventing conversion from liquid to solid fuel in existing units.

According to the present invention there has now been discovered an economical continuous process for the production of energy from solid hydrocarbon fuels comprising:

(a) conveying a solid hydrocarbon fuel through a reactor substantially filled with $CO_2$ and raising the temperature within said reactor to at least about 400° C. whereby in the substantial absence of air said solid hydrocarbon fuel reacts endothermically with said $CO_2$ to form CO;

(b) conveying the relatively light CO and other accompanying and formed gases from the top of said reactor to a combustion chamber for exothermic reaction of the CO gas with $O_2$ to form $CO_2$ and to generate both heat and gas pressure energy; and (c) recycling at least a portion of the gases exiting from said combustion chamber to a reactor for reaction with solid hydrocarbon fuel.

As will now be realized using the principles of said process the present invention also provides a process for the economical conversion of liquid-fuel heated, steam-operated, electric-generating stations to a solid hydrocarbon fuel energized system comprising connecting a gas-solid reactor unit in series to the boiler of said electric generating station and proceeding according to the process as defined.

Thus, according to the invention, it is now possible to achieve the conversion of electric stations and turbines from gas or liquid fuel to solid fuel consumption merely by the construction and installation of a gas-solid reactor auxiliary unit without the need for substantially modifying the combustion chamber or boiler of the existing units.

In the process of the present invention the reactor is preferably maintained at a temperature of about 500° to about 550° C. to achieve a semi-coking of the solid hydrocarbon fuel whereby there is produced a waste product of tar, tar water, sulphur, benzol ($C_6H_6$) etc. which can be collected for industrial processing and use.

Heat generation in the reactor of temperatures of about 500° to 550° C. can be by heating the reactor from the outside or alternatively by partial exothermic combustion of combustible materials inside the reactor, e.g., the reactions of:

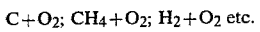

$$C+O_2; \quad CH_4+O_2; \quad H_2+O_2 \text{ etc.}$$

The oxidation of these materials is effected by providing for the controlled and limited access of outside air into the reactor in amounts which do not cause the temperature to rise higher than to 500°–550° C., e.g., by providing a thermostatically controlled air inlet gate valve whereby at 550° C. the outside air inlet gate closes, while when the temperature decreases below 500° C. the outside air inlet gate opens. A simultaneous supply of steam is also beneficial.

It is recognized, of course, that the reaction of solid hydrocarbon fuel with $CO_2$ under semi-coking conditions is in itself known.

Thus, as is described and as is known from "Metallurgicheskaia teplotekhnika" (Heat Engineering in Metallurgy) by V. A. Arutiunov, V. I. Mitkalinnyi, S. B. Stark. Vol. I, "Metallurgia" Publ. House, Moscow, 1974, p. 506, during World War II "the great demand for liquid fuel led to the necessity of producing it artificially out of solid fuel, such as, for instance, tar obtained in the course of semi-coking. Tars were also produced as wastes in the course of solid fuel gasification. The composition and physical properties of the tars depend on the original raw material and the method by which it is treated. The tar composition varies within the following percent range: 80°–90° C., 7–12 H, 2–15 O+N. The tars have a heat of combustion as high as Q=29.3–37.7 MJ/kg.

In order to obtain various kinds of motor fuel, tar as well as raw oil can be subjected to fractional distillation or cracking.

Tar can also be used as carburizer in the combustion of gases whose flames have low luminosity (as, for instance, blast furnace gas). Because of the presence of compound heavy hydrocarbons in its composition the tar greatly contributes to the flame luminosity in the combustion process."

Said prior art reactions, however, were designed for the production of the liquid fuel and do not teach or suggest the process of the present invention wherein the production of the processible tars is merely a side benefit of the more important energy generating process.

Thus, as stated in the process of the present invention, the CO gas produced in the reactor is preferably conveyed to the combustion chamber of a gas turbine engine or other different type engines whereupon the gas pressure energy generated by the reaction of the CO and $O_2$ is used to drive said gas turbine or alternatively the CO gas produced in the reactor can preferably be conveyed to the gas burner of a boiler whereupon the heat generated by the reaction of the CO and $O_2$ is used to heat water in pipes circulating in said boiler.

The invention will now be described in connection with certain preferred embodiments with reference to the following illustrative figures so that it may be more fully understood. It is stressed, however, that the particulars discussed are by way of example and for purposes of illustrative discussion only and are presented in the cause of providing what is believed to be the most useful and readily understood description of the principles and conceptual aspects of the invention. In this regard, no attempt is made to show structural details of the system and its apparatus in more detail than is necessary for a fundamental understanding of the invention the description making apparent to those skilled in the art how the several forms of the invention may be embodied in practice.

In the drawings:

FIG. 1 is a flow diagram illustrating an installation for carrying out the described process.

FIG. 2 is a schematic diagram illustrating an installation for continuous feeding of solid hydrocarbon fuel to the reactor.

FIG. 3 is a schematic diagram illustrating an installation for continuous removal of slags from the reactor.

Referring first to the flow diagram of FIG. 1 as illustrated, the process can be carried out in an installation comprising a gas-solid reactor 2 and a boiler or gas-turbine-engine combustion-chamber 4 connected in series.

The reactor 2 is preferably heat-insulated, e.g., with refractory bricks to prevent heat loss and facilitates the maintenance of a constant temperature therein. Solid hydrocarbon fuel is continuously introduced by feeder means 8 into the reactor, which reactor is preferably maintained at a constant temperature of about 500°-550° C. by heating means 10. Alternatively, as discussed hereinbefore, it is also possible to generate and regulate thermal heat in the reactor instead of using external heating means 10 by providing a thermostatically controlled air-inlet valve 6 for allowing the controlled access of a limited amount of air to said reactor to allow sufficient partial exothermic combustion of combustible materials inside said reactor to maintain the temperature therein in a range of about 500°-550° C.

$CO_2$ gas is introduced into said reactor via line 12. The $CO_2$ reacts endothermically with C of the solid hydrocarbon fuel according to the reaction $CO_2 + C \rightarrow 2CO$.

The relatively light CO gas formed together with other light gases such as $H_2$, $CH_4$, $H_2O$ (steam) rise into a light gas collector 14 at the top of the reactor and and are conveyed via line 16 with the help of fan 18 or injection into the gas inlet 20 of gas-fuel burner or combustion chamber 4.

In said chamber the CO gas undergoes an exothermic reaction with $O_2$ to generate both heat and gas pressure energy which is drawn off 22 and utilized in the manner described.

At least a portion of the gases produced in said combustion chamber 4, e.g., $CO_2$, $N_2$, $O_2$, $H_2O$ (steam) and exiting therefrom can then be recycled via line 12 to said reactor 2 for further reaction with the solid hydrocarbon fuel.

The remaining portion of gas can be vented with the help of fan 26 to a smokestack 28 for subsequent discharge or can be used in the manner described hereinafter.

With said general flow plan and installation description in mind the process of the present invention can be better understood as proceeding as follows:

Ground coal, shale or, possibly, peat (preferably dried) is charged into reactor 2, where it is preferably delivered onto a slowly rising conveyor 34 (FIG. 2). The reaction proceeds endothermically without the access of air and heat is continuously supplied to the reactor from external heating means 10 until the temperature within it reaches about 500°-550° C. or the reaction proceeds endothermically simultaneously with the limited heat producing exothermic combustion reactions allowed by the limited inlet of air via valve means 6.

The carbon content of coal, shale or peat combining with carbon dioxide results in the formation of carbon monoxide. In the present reactor as distinct from coke furnance batteries the entire semicoke also converts to gas according to the reaction $C + CO_2 = 2CO$, while the charging of coal, shales or peat into the reactor and their passage through it as well as the subsequent discharge is effected by a non-stop conveyor method.

At 550° C. the combustible gases $H_2$, $CH_4$ and $H_2O$ (steam) evolve from coal, shales or peat, with CO also formed. Tar, sulphur, benzol ($C_6H_6$) and other chemical wastes flow downwards 36 and then outside and may be used in chemical production. Slag 38 is removed by conveyor 40 (FIG. 3) or by other means and can be utilized for cement manufacture. In this connection it should be borne in mind that gases formed have low specific weights: $CO = 1.25$; $H_2 = 0.09$; $CH_4 = 0.716$; $H_2O$ (steam) $+ 0.805$; and will, therefore, float upwards into the lighter gas collector 14 to be forced from there by fan 18 or by injection means (not shown) to the gas burners 4 of a boiler or the combustion chamber 4 of a gas turbine, $CO_2$-gas is heavy with a specific weight of 1.965 and fills the whole of the internal space of the reactor up to the lighter gas collector. The replenishment of the reactor with $CO_2$-gas is accomplished by recycling at least a portion of the $CO_2$ containing gases from the combustion chamber to a reactor for reaction with solid hydrocarbon fuel. The remaining portion of the gases produced may be ejected or used elsewhere since the $CO_2$ is formed in quantitites which are about twice those consumed in the reactor (leakage losses being disregarded).

Thus, one of the main advantages of the invention is in the fact that should an oil boycott be instituted, the same equipment that was used prior to the implementation of the oil boycott can be used unaltered while using other kinds of fuel instead of petroleum products, namely, coal, shales and, possibly, peat, no additional equipment being necessary apart from the reactors described above.

It should be borne in mind that this installation produces twice as much $CO_2$ as compared to the volume consumed, and this gas may, therefore, be used for other purposes, e.g., for dry ice production instead of being merely vented from a smokestack.

Other technical and economical advantages of the process of the present invention can be enumerated as follows:

1. In coal and shale combustion at power stations (in boilers) the excess air ratio is 1.3 to 1.5 as compared to 1.05 to 1.1 in gas combustion.

2. In order to burn gas in a boiler or turbine combustion chamber, no reequipment of these from fuel oil to coal, shale or peat will be necessary, the only additions being the construction of the reactors as described.

3. In using the above installation smoke cleaning devices become unnecessary.

4. For gas turbine engines, the excess air ratio may be lowered since the calorific power of the gas obtained in the present case is lower than that prevailing in the fuel currently used in present-day engines. This, in its turn will improve technical and economical characteristics of gas turbine engines.

5. The above method is conducive to the formation of a great many chemical wastes: tar, sulphur, benzol ($C_6H_6$) etc. on the basis of which chemical production may be founded.

6. It becomes possible for coal and petroleum products used in boiler or stationary gas turbine installations to be replaced by gas which is produced according to the flowsheet proposed herein.

7. It becomes possible to burn coals, shales and, possibly, peat as well in turbine installations after previous conversion to gas while obviating the use of boiler units which exist in present-day electric power production flow-sheets.

The following is a brief calculation of the economy of the method:

$$CO_2 + C \longrightarrow 2CO - 41000 \text{ kcal}$$

$$2CO + O_2 \longrightarrow 2CO_2 + 135000 \text{ kcal}$$
$$135000 - 41000 = 94000 \text{ kcal}$$
$$94000 : 12 = 7833 \text{ kcal/kg}$$

In the case of coal with, for instance, C=50% and $H_2$=4.3% by weight we have (per kg coal): 7,833×0.6=4700 kcal/kg whereas $H_2$ gives ≃1200 kcal/kg coal ($H_2$—29,000 kcal/kg gas).

Heat supplied along with the gas into the boiler furnace or turbine combustion chamber will amount, particularly for CO, at 0.25 kcal/kg°C. for carbon monoxide to $$(0.25 \times 550 \times 56 \times 0.6)/12 = 384 \text{ kcal/kg coal}$$

Thus, the total amount of heat supplied by 1 kg coal to the boiler furnace or turbine combustion chamber will be $$4,700 + 1,200 + 384 = 6,234 \text{ kcal/kg coal}$$

According to the Handbook the calorific power of the above coal equals only 5,610 kcal/kg.

Thus, it will be realized that the present invention maximizes the energy output generatable from coal.

This calculation does not take account of (a) the heat supplied to the reactor with carbon dioxide (the temperature of $CO_2$-gas>200° C. after an economizer, or >400° C. without an economizer);

(b) heat losses resulting from the excess air ratio (such losses being greatly reduced in the flowsheet) etc.

The calorific power of CO, disregarding its preheating, equals 3,018 kcal/m³ or 2,417 kcal/kg. Thus, 12 kg C give 85.5 m³, $N_2$ and 44.8 m³ CO and other gases exiting through line 16.

Referring briefly now to FIGS. 2 and 3 there are illustrated possible installations for solid fuel charging and slag removal minimizing the contact of the reactor with the environment.

In the installation of FIG. 2 the solid hydrocarbon fuel is charged into reactor 2 via feeder means 8 onto a slowly rising conveyor means 34. The slag waste of the reaction is deposited onto conveyor 40 and the commercially usable tar, benzol, etc. is collected into flow collector 36 for industrial processing.

In the installation of FIG. 3 the slag 38 on conveyor belt 40 is carried out of an exit slot 42 from the reactor which exit slot is bracketed by $CO_2$ feed lines 12 to minimize air intake into the reactor. An exhaust hood 50 is provided over the slag discharge area and fan unit 18 conveys any exhaust gases to the smokestack 28.

While particular embodiments of this invention have been described it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A process for the production of energy from solid hydrocarbon fuels selected from the group consisting of ground coal, shale, and peat comprising:
   (a) conveying solid hydrocarbon fuel by means of a continuous conveyor through a reactor substantially filled with $CO_2$ and raising the temperature within said reactor to at least about 400° C. whereby in the substantial absence of air said solid hydrocarbon fuel reacts endothermically with said $CO_2$ to form CO;
   (b) conveying the relatively light CO and other accompanying gases from the top of said reactor to a combustion chamber for exothermic reaction of the CO gas with $O_2$ to form $CO_2$ and to generate both heat and gas pressure energy;
   (c) recycling at least a portion of the gases exiting from said combustion chamber to a reactor for reaction with solid hydrocarbon fuel; and
   (d) collecting for further industrial processing and use the waste product of said hydrocarbon fuel reaction with $CO_2$ by discharging the waste product from said continuous conveyor.

2. A process according to claim 1 wherein said reactor is maintained at a temperature of about 500° C. to about 550° C.

3. A process according to claim 2 comprising providing for the controlled access of a limited amount of air to said reactor to allow sufficient partial exothermic combustion of combustible materials inside said reactor to maintain the temperature therein in a range of about 500° C. to about 550° C.

4. A process according to claim 1 wherein the CO gas produced in the reactor is conveyed to the combustion chamber of a gas turbine or different type engine whereupon the gas pressure energy generated by the reaction of the CO and $O_2$ is used to drive said gas turbine or other engine.

5. A process according to claim 1 wherein the CO gas produced in the reactor is conveyed to the gas burner of a boiler whereupon the heat generated by the reaction of the CO and $O_2$ is used to heat water in pipes circulating in said boiler.

6. A process for the economical conversion of liquid fuel heated steam-operated electric-generating stations to a solid hydrocarbon fuel energized system comprising connecting a gas-solid reactor in series to the boiler of said electric generating station and proceeding according to the process as defined in claim 1.

* * * * *